UNITED STATES PATENT OFFICE.

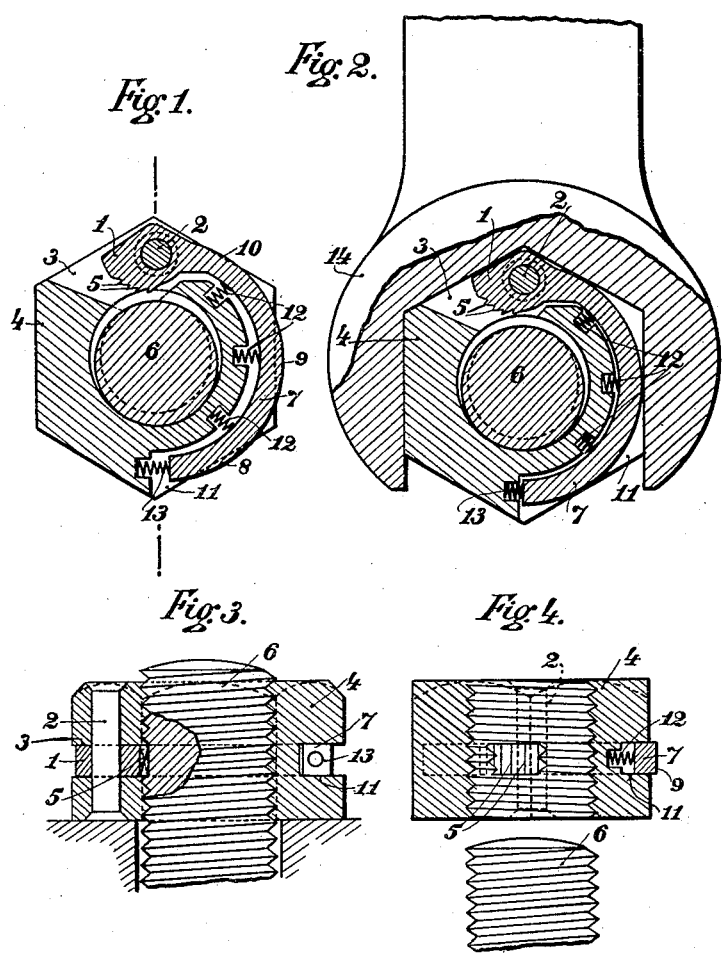

FRANK RIPPINGILLE, OF SUTTON COLDFIELD, AND HOWARD THOMAS MARTIN, OF BIRMINGHAM, ENGLAND.

NUT-LOCK.

1,000,196.  Specification of Letters Patent.  Patented Aug. 8, 1911.

Application filed June 4, 1910. Serial No. 565,114.

*To all whom it may concern:*

Be it known that we, FRANK RIPPINGILLE and HOWARD THOMAS MARTIN, subjects of the King of Great Britain, residing at The Cottage, Four Oaks, Sutton Coldfield, England, and Granville street, Birmingham, England, respectively, have invented certain new and useful Improvements in Nut-Locks, of which the following is a specification.

This invention relates to nut-locks employed for preventing nuts inadvertently working loose by vibration and the like.

The principal object of the present invention is to provide an improved form of lock which is simple in construction but efficient in operation, and to provide means whereby the applying of the spanner to the nut in any direction will automatically release the locking element and free the said nut, allowing it to be removed in the ordinary manner without fear of injury either to the threads or to the nut itself.

Figure 1 of the accompanying drawings represents a horizontal section through a hexagonal nut provided with a locking device constructed and arranged in accordance with this invention. This view shows the pawl in engagement with the threads of the bolt. Fig. 2 shows the nut engaged by the spanner and the pawl released from engagement with the bolt. Fig. 3 is a vertical section in the plane of the centrally located broken lines of Fig. 1. Fig. 4 is a vertical cross-section through the nut detached from the bolt, the latter being shown in elevation.

The same letters of reference indicate corresponding parts in each of the figures of the drawings.

The locking device consists of a pawl 1 pivoted at 2 within a recess 3 in the nut 4, and having a ratchet-toothed gripping edge 5 engaging with the threads of the bolt 6. The said edge 5 is of a cam or eccentric formation, having its curved edge struck from a center located upon one side of the pivot, and the pawl is so mounted that the point of contact with the bolt comes behind (with reference to the direction of rotation of the nut) the radial line drawn from its fulcrum to the center of the bolt, so that while the nut is being screwed on, the toothed edge 5 of the pawl simply wipes over the threads and allows of the free rotation of the nut, but as soon as the latter tends to back-off or loosen then the frictional contact causes the pawl 1 to turn on its fulcrum in such a manner that the toothed edge 5 engages with or impinges against the threads of the bolt 6 and automatically sets up a jamming or wedging action with the threads and locks the nut. The pawl 1 is provided with a long tail or rearward extension 7, of a curved form as shown, whose outer edge normally extends, at 8, 9, and 10, slightly beyond the three adjacent sides or facets of the nut, the said tail being located within a recess 11 in the side of the nut. Springs 12, 13, (or a single spring) act upon the tail in order to keep the edge 5 of the pawl in engagement with the threads of the bolt. On applying a spanner 14 (see Fig. 2) to the nut in any direction whatever, so as to embrace any two facets, one of its two jaws will engage with one of the projecting parts 8, 9, or 10, of the pawl tail 7 and force the latter inward, compressing the spring or springs and taking the toothed edge 5 of the pawl out of engagement with the threads of the bolt, thus releasing the nut and allowing of it being removed in the ordinary manner. In the case of a four-sided nut the tail of the pawl need only extend beyond two faces, while in an eight or more sided nut it would extend beyond four or more sides as may be required.

Instead of the releasing member being in one piece with the locking device, it may be separate therefrom but adapted to engage with and release same on the application of the spanner.

Having fully described our invention, what we desire to claim and secure by Letters Patent is:—

1. In a nut lock, a nut having a recess which extends to its bore, a pawl pivoted in the recess, the pawl having a toothed cam-faced engaging portion eccentric to its pivot and of such outline that its point of engagement with the bolt is at the rear of a radial line drawn from its pivot to the center of the bolt, and a spring for holding the pawl normally in engagement with the bolt, the pawl also having a part which normally projects beyond an edge face of the bolt and which when forced inwardly, causes the toothed engaging portion to disengage the bolt.

2. In a nut lock, a polygonal nut having a recess which extends to its bore, a device movably mounted in the recess and for locking engagement with the bolt, a spring for causing the engagement of the locking device and the bolt and a part associated with the locking device and concentric to the bolt, the part having such extent as to project beyond half of the edge faces of the nut and being operable, when pressed inwardly, to cause the disengagement of the locking device and the bolt.

3. In a nut lock, a polygonal nut having a recess which extends to its bore, a pawl pivoted in the recess, the pawl having a toothed bolt engaging portion adjacent its pivot and having also a curved tail normally concentric to the bolt and of such extent as to project beyond half of the edge faces of the nut, the tail being rigidly associated with the pawl and, when pressed inwardly, causing the disengagement of the toothed engaging portion and the bolt, and springs which normally force the tail outwardly and cause the engagement of said engaging portion and the bolt.

In testimony whereof we have hereunto set our hands in presence of two subscribing witnesses.

FRANK RIPPINGILLE.
HOWARD THOMAS MARTIN.

Witnesses:
Hy. Skerrett,
Henry Norton Skerrett.

---

Copies of this patent may be obtained for five cents each, by addressing the "Commissioner of Patents. Washington, D. C."